US010715692B2

(12) United States Patent
Anbalagan et al.

(10) Patent No.: US 10,715,692 B2
(45) Date of Patent: Jul. 14, 2020

(54) SYSTEMS AND METHODS FOR LOCALIZING A USER INTERFACE BASED ON AN INPUT DOCUMENT

(71) Applicant: XEROX CORPORATION, Norwalk, CT (US)

(72) Inventors: Ashok Raj Anbalagan, Chennai (IN); Premkumar Balasubramanian, Madurai (IN); Srividhya Rengasamy, Dindigul (IN)

(73) Assignee: XEROX CORPORATION, Norwalk, CT (US)

( * ) Notice: Subject to any disclaimer, the term of this patent is extended or adjusted under 35 U.S.C. 154(b) by 163 days.

(21) Appl. No.: 15/490,097

(22) Filed: Apr. 18, 2017

(65) Prior Publication Data
US 2018/0302520 A1   Oct. 18, 2018

(51) Int. Cl.
*G06F 3/00* (2006.01)
*H04N 1/00* (2006.01)
*G06F 40/263* (2020.01)

(52) U.S. Cl.
CPC ....... *H04N 1/00498* (2013.01); *G06F 40/263* (2020.01); *H04N 1/00514* (2013.01); *H04N 2201/0094* (2013.01)

(58) Field of Classification Search
CPC .. G06F 3/0482; G06F 3/0484; G06F 17/2223; G06F 17/275; H04N 1/00498; H04N 1/00514; H04N 2201/0094
See application file for complete search history.

(56) References Cited

U.S. PATENT DOCUMENTS

| | | | | |
|---|---|---|---|---|
| 2002/0154154 A1* | 10/2002 | Cornelius | ............. | G06F 3/0481 715/705 |
| 2012/0079376 A1* | 3/2012 | Grellmann | .......... | G06F 3/04817 715/703 |
| 2014/0172408 A1* | 6/2014 | Vukosavljevic | ...... | G06F 17/211 704/2 |
| 2014/0215330 A1* | 7/2014 | Lee | ...................... | G09B 29/007 715/703 |

* cited by examiner

*Primary Examiner* — Anil N Kumar
(74) *Attorney, Agent, or Firm* — Jones Robb, PLLC (57) ABSTRACT

The present disclosure discloses methods and systems for localizing a user interface of a device such as a multi-function device, the multi-function device presents a user interface in a pre-defined language. The method includes receiving a document, the document includes text information in a local language of a user. Then, the document is analyzed to identify the local language of the user. Upon identification, the pre-defined language of the user interface is changed to the identified local language of the user. The local language enables the user to operate the multi-function and/or perform one or more functions using the local language.

31 Claims, 7 Drawing Sheets

SYSTEMS AND METHODS FOR LOCALIZING A USER INTERFACE BASED ON AN INPUT DOCUMENT

TECHNICAL FIELD

The disclosure generally relates to the field of user interfaces, and, more particularly, to systems and methods for generating or localizing a user interface based on an input document.

BACKGROUND

Business devices such as a multi-function device, a photocopier machine, a scanning device etc., allow users to perform various functions like printing, copying or scanning. With the advancement of technology, it has become a common practice in the consumer goods (or appliances) industries to configure languages in such devices/products based on geography or location where these devices are distributed, sold and/or operated. For example, if a consumer appliance (e.g., photocopier machine) is intended to be distributed and/or sold in China, the consumer appliance is configured in Mandarin or Cantonese language. Similarly, if a consumer appliance is to be sold in Japan, the appliance is configured in Japanese language by default.

In this manner, it becomes easy for local people (i.e., people who understand Japanese language) to operate these devices and difficult for other users (users who don't understand or know Japanese language) to operate the same devices. For example, a person from United States of America goes to a particular location in Japan, where all devices are configured in a native language of Japan and wishes to operate a scanning device. Here, the user may not be able to operate the device because he does not understand or is not well versed with the Japanese language. In such a scenario, the user has to rely on local users of that particular location (or individuals) who can easily understand the language configured in such devices.

At times, the business devices are configured with English language since it is the often language that people attempt to speak or read but still some users may not understand it properly, hence may not be able to operate these devices. Some solutions are available to change the language of the devices. For example, manufacturers provide options to select one or more preferred languages to operate the device, however, those options involve knowing the device by reading through manuals (e.g., booklet, or digital manuals), and manually select the preferred language and then operate the device. The manual selection of the preferred language(s) by users may result in errors or may lead to discomfort to users and thus is not a desirable option. Moreover, the manual selection seems a time consuming activity. Also, if the device is already in a different language say, Japanese, then it is difficult to go till menu and then change the language. Other solutions include changing the language via voice feedback but it becomes difficult if a person is disabled or if the accent of the person is not very clear. In such cases, the voice feedback may not be helpful. In view of the above, there is a need for methods and systems to enable users to operate such devices with ease, for example, in their respective local language.

SUMMARY

According to aspects illustrated herein, there is a method for presenting a local language user interface on a multi-function device. The method includes receiving an input document by the multi-function device, the input document includes at least text information in a local language of a user, the multi-function device presents a user interface in a default language. A partially scanned electronic version of the input document is created. Then, the partially scanned electronic version of the input document is analyzed to identify the local language. Upon identification, the user interface in the identified local language is automatically presented, the user interface in the local language enables the user to operate the multi-function device.

According to aspects illustrated herein, there is a processor implemented method for localizing a user interface of a multi-function device. The method includes detecting an input document by the multi-function device, wherein the input document includes text information in one or more local languages of a user, the multi-function device presents a user interface in a pre-defined language. The input document is processed to recognize the one or more local languages. Then, an option indicating the one or more local languages is displayed to the user via the user interface. Thereafter, a selection of a local language is received from the one or more recognized local languages. Based on the selection, the pre-defined language of the user interface is changed to the selected local language of the user.

According to aspects illustrated herein, there is a method for localizing a user interface. A hard copy of an input document is scanned using a multi-function device. The input document includes text information in a local language of a user, the multi-function device automatically presents a user interface for operation in a pre-configured language. One or more character recognition operations are performed to identify the local language of the user. Based on the identification, the pre-configured language of the user interface is automatically changed to the local language for performing one or more functions by the user.

According to aspects illustrated herein, a multi-function device for localizing a user interface is disclosed, the user interface is presented in a pre-defined language. The multi-function device includes a feeder unit, a scanner and a control system. The feeder unit is configured to receive a hard copy of a document, the document includes at least text information in a local language of a user. The scanner is configured to scan the hard copy of the document to create an electronic version. The control system is configured to: analyze the electronic version to identify the local language of the user; and automatically change the pre-defined language of the user interface to the local language of the user, for operating the multi-function device.

According to aspects illustrated herein, a system is disclosed. The system includes a server and a multi-function device. The server is configured for: receiving an electronic version of a document from a multi-function device, the electronic version of the document includes at least text information in a local language of a user; extracting a portion of the text information to identify the local language of the user using one or more techniques; and sending the identified local language information to the multi-function device. The multi-function device presents a user interface in a pre-defined language, the multi-function device is in communication with the server, and is further configured for: receiving the local language information from the server; displaying the local language option to the user for selection; changing the pre-defined language of the user interface to the local language of the user; and displaying the user interface having one or more pre-defined options in the local language of the user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. The multi-function device is configured with a pre-defined language based on geography or a location where the device is sold or distributed. In the context of the current disclosure, the multi-function device is configured to detect one or more local languages based on an input document and accordingly change the pre-defined language of the device.

The "pre-defined language" is the language which the multi-function device is configured with at the time of manufacturing. The pre-defined language is also called as a default language or pre-configured language of the multi-function device. For example, the pre-defined language of the multi-function device may be, but not limited to, English. The pre-defined language is dependent on geography or location where the multi-function device is sold or distributed.

The term "local language" refers to the language which is understood or known by the user, who wishes to operate the multi-function device. Further, the local language is determined based on the input document fed by the user to the multi-function device. The local language may also be termed as the native language of the user.

The term "user interface" is defined to include an interface shown on the multi-function device and is operable by the user to perform one or more functions such as change setting, check status, initiate scan, print, fax, print, copy, or any other functions. Here, the user interface displays an option to the user to change the pre-defined language of the device to the local language.

The phrase "input document" is defined to include any document with at least text information. While the input document may also include images, graphics, or any other type of content. Further, the text information is present in one or more local languages of the user. Further, the input document refers to a hard copy of the document. The input document may interchangbly be used with the phrase "document."

The term "electronic version" refers to a soft copy or a digital copy of the input document.

The term "processing" includes analyzing the input document and extracting a portion of the text information to recognize the local language of the user.

Overview

Typically business devices such as multi-function devices are manufactured such that the devices overall provide same kind of functionality to all users. But due to different languages adopted across the world, the manufacturers configure these devices in a language specific to a region, where these devices are sold or distributed. Most of the people are able to operate the device in a default language but some people (outside users or other users) may not be comfortable to operate the multi-function device in the default language. In order to enable users to operate the multi-function device according to their comfort or languages known to them, the present disclosure is provided.

The present disclosure provides methods and systems for localizing a user interface of a device, one such popular example is a multi-function device. The user interface is localized based on an input document. The device scans at least a portion of the document to recognize or detect a local language. Once recognized, the device automatically changes default language of the device to the local language. In this manner, the user is able to operate the multi-function device in his or her local language and thus provides comfort and flexibility to the user to operate the multi-function device.

For a person skilled in the art, it is understood that the term scanning is used to create an electronic version of a document that is used to identify the local language and this is initiated automatically by the multi-function device as it receives a hard copy of a document. Therefore, partial scanning or complete scanning of the document may be performed. And this scanning should not be confused with an operation scanning as initiated by the user after the local language detection.

Exemplary Environment

Figure 1:
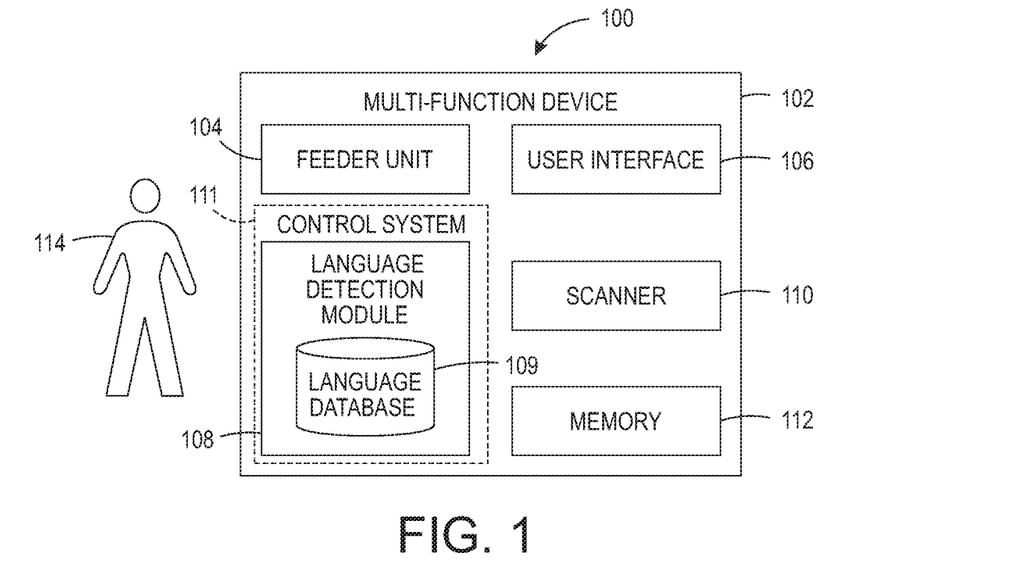
FIG. 1 is an exemplary environment in which various embodiments of the disclosure can be practiced.

FIG. 1 is an exemplary environment 100 in which various embodiments of the disclosure can be practiced. The environment 100 includes a business device such as a multi-function device 102 and a user 114. The user 114 operates or uses the multi-function device 102 for his day-to-day tasks such as printing, copying, imaging, scanning, or a combination of these. As shown, the multi-function device 102 includes a feeder unit 104 (also known as platen), a user interface 106, a language detection module 108 having one or more language databases 109 (collectively referred to as a control system 111), a scanner 110 and a memory 112. The language detection module 108, and the one or more language databases 109 form a part of the control system 111. Other components such as 110 or 112 may be a part of the control system 111. Each of the components 104, 106, 108, 109, 110 and 112 are coupled to each other via a communication bus or later developed protocols. Further, each of the components communicate with each other for localizing the user interface 106 of the multi-function device 102. The multi-function device 102 may include one or more additional components to implement the current disclosure. For example, the multi-function device 102 may include a processor (although not shown) to execute instructions stored in the memory 112.

By default, the multi-function device 102 is configured to operate in a pre-defined language. The pre-defined language is based on geography where the multi-function device 102 is distributed or sold. For example, if there is a multi-function device 102 in the United States, the multi-function device 102 is operable in the language English. In another example, if the multi-function device 102 is sold in Japan, the multi-function device 102 is operable in Japanese language. In the context of the present disclosure, the multi-function device 102 localizes the user interface 106 of the multi-function device 102 based on an input document and this will be explained further. The multi-function device 102 presents the user interface 106 in a pre-defined language or the default language.

Initially, the user 114 who wishes to use the multi-function device 102 for scanning, copying or any other purpose provides an input document. The user 114 places the input document on the feeder unit 104. The input document includes any document (i.e., a hard copy of the document) which the user 114 wishes to scan, copy or so forth. The input document includes at least text information, however, the input document may include images, graphics etc. Further, the input document includes the text information in a local language i.e., a language which is known to the user 114 or the language that the user 114 is comfortable with. While in other embodiments, the input document may include the text information in more than one local language of the user. Some examples of the input document may include, but not limited to, any ID proof, address proof, an application form, a hand-written document, notes, or the like. These are just few examples of the input document, but the disclosure may be implemented for any kind of document as known in the art or later developed and the type of input document does not interfere in the implementation of the current disclosure.

The feeder unit 104 receives and detects the input document and passes the input document to the scanner 110.

The scanner 110 scans the hard copy of the input document to create a digital copy (or an electronic version). The scanner 110 may partially scan the input document to create the partially scanned electronic version of the input document, while the scanner may scan the input document in complete to create the complete electronic version of the input document. For example, the scanner may scan initial 2-3 lines to create a partially scanned electronic version. The created (partial or complete) electronic version is passed to the control system 111 for further processing, in particular to the language detection module 108.

The language detection module 108 analyzes the scanned electronic version of the input document to identify the local language of the user. Analyzing the electronic version of the input document includes extracting a portion of the text information to identify the local language using one or more techniques such as Optical Character Recognition (OCR), Intelligent Character Recognition (ICR), Optical Word Recognition (OWR), and Intelligent Word Recognition (IWR) or any other techniques as known in the art or developed later. Generally, the language detection module 108 is trained with a wide range of characters from various languages. The language detection module 108 is trained to identify characters, words, sentences or a combination thereof. The module 108 identifies characters of the extracted text information and upon identifying the character by character, the word is captured. Using the word, the language of the input document is identified. If still the language is ambiguous, the language detection module 108 captures the entire sentence to identify the local language.

Once identified, the module 108 retrieves the local language from the one or more language databases 109 and displays the local language via the user interface 106. The one or more language databases 109 include one or more languages. Various examples of the languages include, but not limited to, Spanish, French, Chinese, Japanese, English, Hindi, Kannada or the like. These are just few examples and the disclosure can be implemented for any languages as known in the art or later developed. Here, the language detection module 108 automatically changes the pre-defined language of the user interface 106 to the local language of the user 114.

In other embodiments, the module 108 provides an option to the user to change the pre-defined language of the user interface 106 to the identified local language. The user 114 selects the option and based on the user selection, the pre-defined language is changed to the local language. Once the user interface 106 is shown in the local language, the user 114 then performs one or more functions related to scanning, copying and any other function.

As shown, the memory 112 stores the electronic version of the input document as well as details related to the local language of the user 114. The memory 112 may further include one or more language databases 109. The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 112 may further include modules (not shown in FIG. 1) to perform the methodologies described herein.

Figure 2:
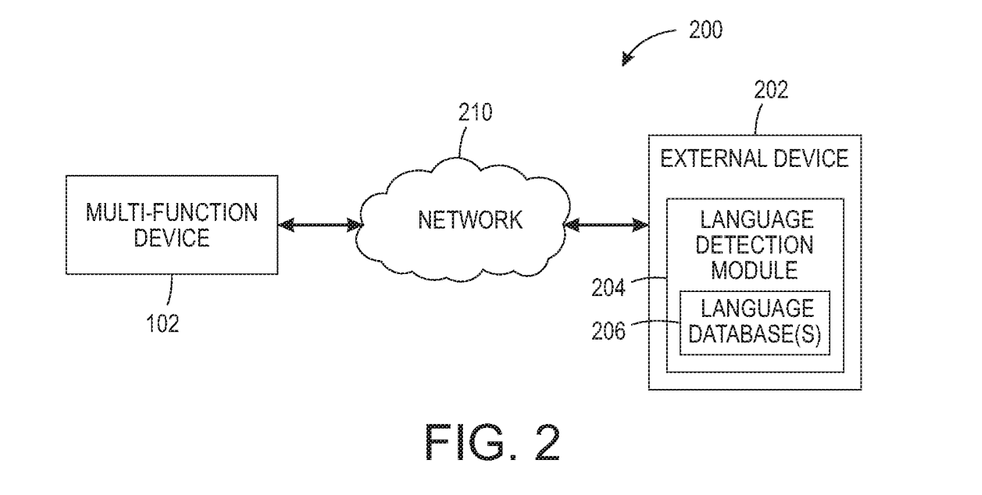
FIG. 2 is another exemplary environment in which various embodiments of the disclosure can be practiced.

In FIG. 1, the language detection part is performed by the multi-function device 102 itself, however in other embodiments the language detection part may be performed by an external device such as a server as discussed in FIG. 2. In other words, all the functionalities are performed by a single standalone device such as multi-function device 102.

FIG. 2 shows another exemplary environment 200 in which various embodiments of the disclosure may be practiced. As shown, the environment 200 includes the multi-function device 102 and an external device 202 connected to the multi-function device 102 over a network 210. In this particular embodiment, a part of functionalities are performed at the multi-function device 102, while other functionalities are performed by the external device 202. Specifically, the language detection functionality is performed by the external device 202. Various examples of the external device include, but not limited to, a server such as a web server, a data server, an external storage, a cloud system, a desktop PC, a notebook, portable computer, a workstation, a mainframe computer, an internet appliance, or the like.

The network 210 may be a wireless network, a wired network, or a combination thereof. The network 210 may also be an individual network or a collection of many such individual networks, interconnected with each other and functioning as a single large network, for example, the Internet or an intranet. The network 210 may be implemented as one of the different types of networks, such as intranet, local area network (LAN), wide area network (WAN), the internet, near field communication (NFC), and such. The network 210 may either be a dedicated network or a shared network, which represents an association of the different types of networks that use a variety of protocols. Further, the network 210 may include network devices, such as network switches, hubs, routers, HBAs, for providing a communication link between the multi-function device 102 and other connected devices/systems.

Operational and structural details of the multi-function device 102 remain the same as discussed above in FIG. 1 and thus, will be discussed very briefly in FIG. 2. In the embodiment of FIG. 2, the multi-function device 102 receives the input document, creates an electronic copy of the input document and sends the electronic copy of the input document to the external device 202 (also referred to as server) for further processing. The external device 202 receives the electronic copy of the document from the multi-function device 102.

As shown here in FIG. 2, the external device 202 includes a language detection module 204 and one or more language databases 206. As discussed above, the language detection module 204 receives the electronic copy and analyzes the electronic copy to identify the local language. The language detection module 204 extracts a portion of the text information using various character recognition techniques to identify the local language. Once identified, the local language information is transmitted to the multi-function device 102.

The multi-function device 102 receives the local language from the external device 202 and checks for the availability of the local language with the device 102. If the local language is available, the device 102 retrieves the local language and displays the local language option to the user. Else, the multi-function device 102 retrieves and downloads the local language from the external device 202 i.e., from the one or more language databases 206. The multi-function device 102 further installs the local language on the multi-function device 102. As a result, the multi-function device 102 changes the pre-defined language of the user interface 106 to the identified local language.

Exemplary Flowcharts and Snapshots

Typically, a multi-function device is pre-configured with a language such as English, that is location or geography dependent language. As a result, all options are presented to the user in the pre-configured language via a user interface. For example, the multi-function device may include a user interface in English language if the machine is imported/exported/sold in countries like United States of America, United Kingdom, etc. and may or may not have the option to change the language preference. Even though if the devices have language change options, changing the language options as known are not desirable.

Figure 3:
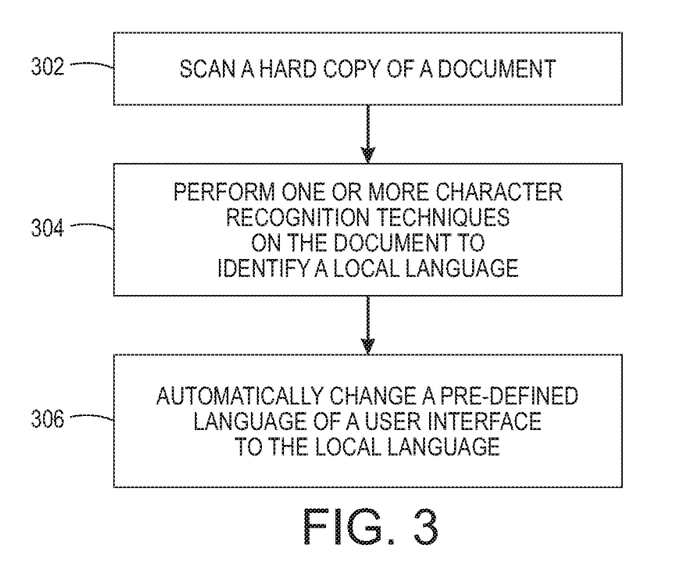
FIG. 3 is a flow diagram illustrating a method for localizing a user interface.

FIG. 3 is a method flowchart for localizing a user interface of a business device such as a multi-function device.

Initially, the user provides an input document to a multi-function device for scanning or for copying, wherein the user interface shows one or more options in a pre-defined language. The pre-defined language may be English, for example. At 302, a hard copy of the document is received for scanning at the multi-function device. The input document includes at least text information, but the input document may also include images, graphics, or a combination of thereof. The text information in the input document is in a local language of a user. The text information may be hand-written text or may also include machine printed text.

Upon receiving the input document, one or more character recognition techniques are performed on the document to identify the local language of the document at 304. For example, an OCR operation may be performed. In particular, the OCR operation is performed to extract a portion of the text information to identify the local language. At 306, based on the identification, the pre-defined language of the user interface (i.e., English) is automatically changed to the local language, for performing one or more functions by the user. The one or more functions may be scanning, copying, printing or any other function. The local language enables the user to easily operate the multi-function device and hence increases the comfort of the user. In some cases, the user may be presented with an option to change the default language of the user interface to the identified local language and thus, a very minimal manual intervention is required.

FIGS. 4A-4D show exemplary snapshots of a user interface of a multi-function device. The primary purpose of the user interface is to enable the user to perform one or more functions such as scanning, copying, printing, change settings, fax, emails, or the like. To this end, the multi-function device displays one or more icons or buttons such as copy/print, fax, documents, shared folders, scan to email, scan to server, scan to PC, scan to shared folders, keypad, and the like.

Figure 4A:
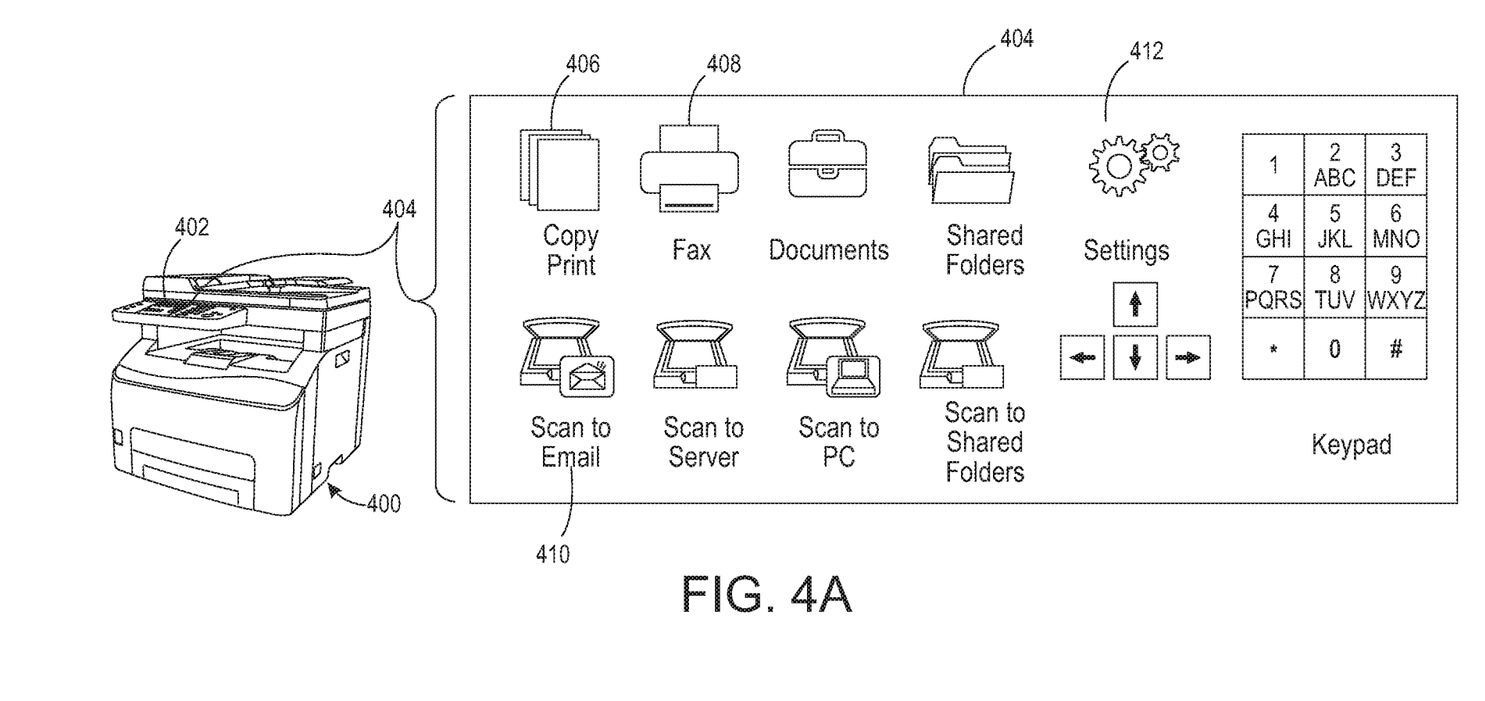
FIGS. 4A, 4B, 4C, 4D illustrate various snapshots indicating user interfaces of a multi-function device.
Figure 4B:
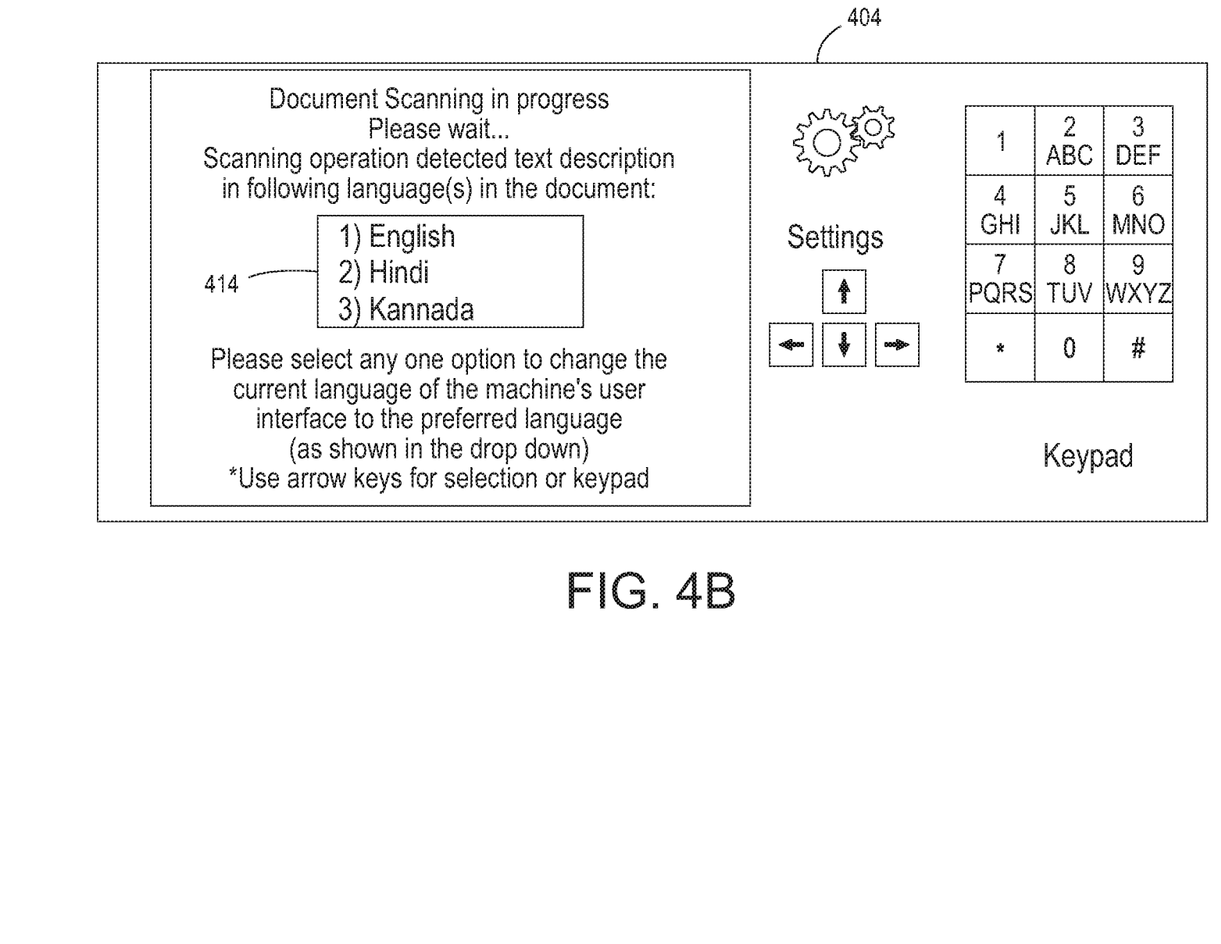
Figure 4C:
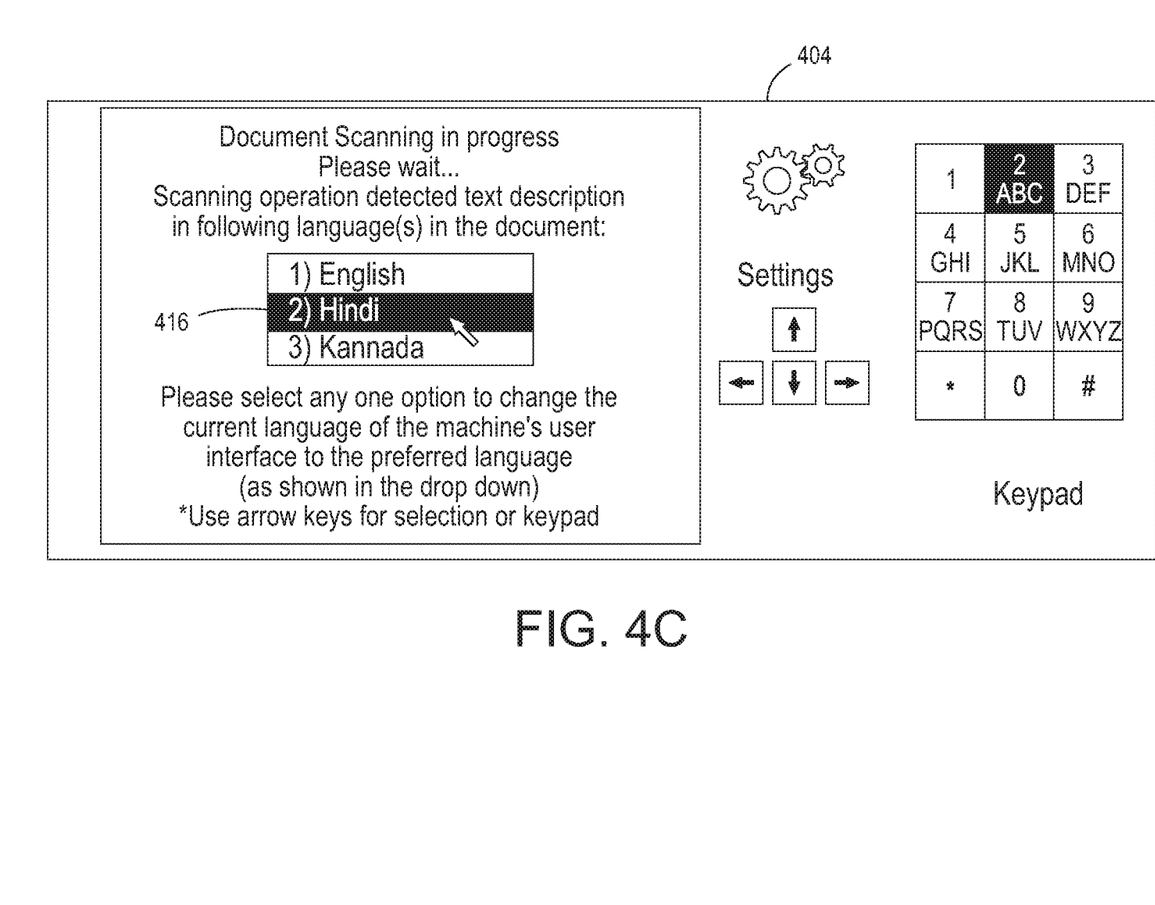
Figure 4D:
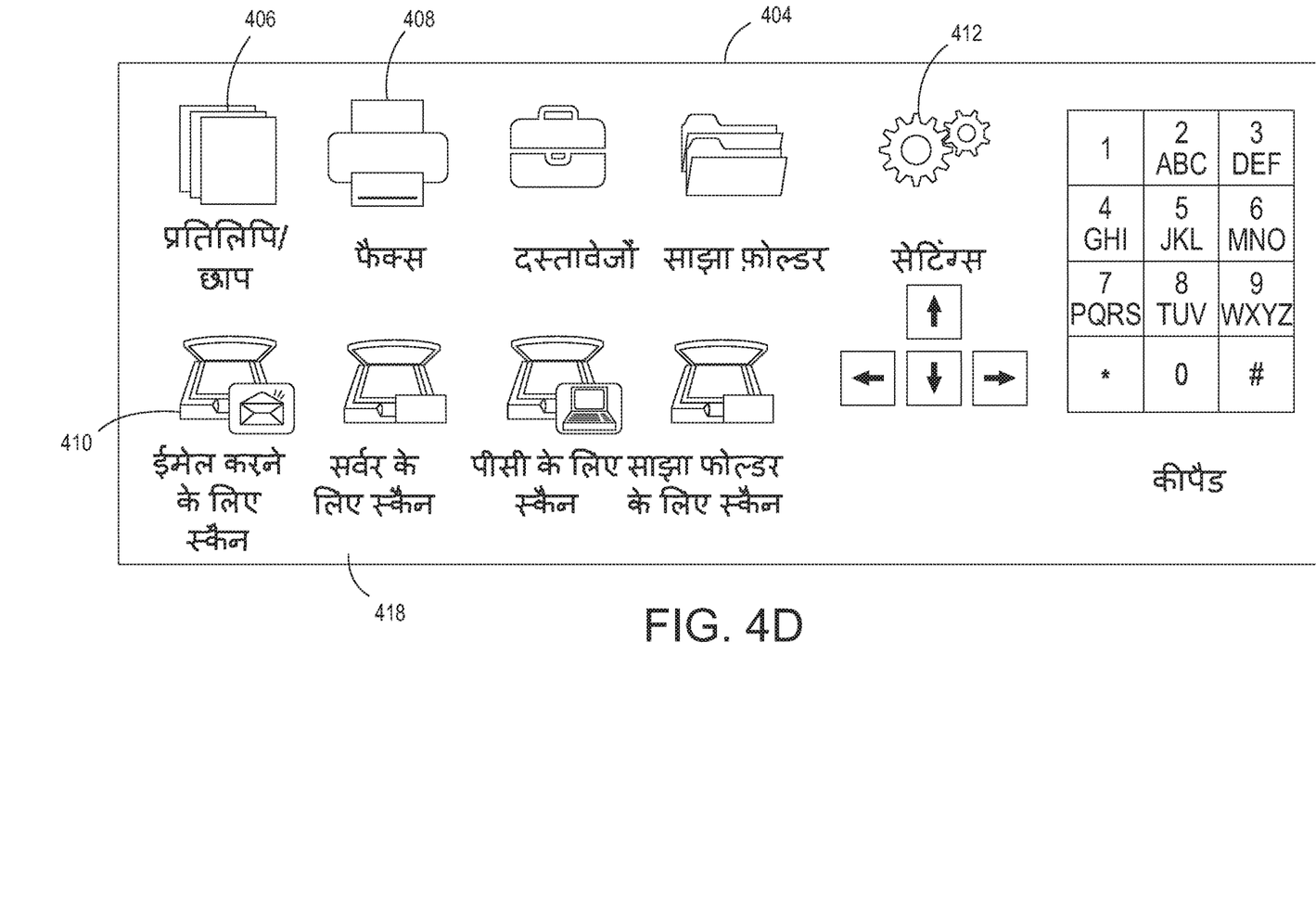

As shown in FIG. 4A, a device 400 such as a photocopier machine presents a user interface 402, an enlarged view of the user interface 402 is shown as 404 in FIG. 4A. The user interface 404 shows various functionalities/options to the user such as Copy Print 406, Fax 408, Scan to Email 410, Settings 412, etc. As clearly depicted from the snapshot, the options are shown in a pre-defined language such as English. Based on the input document as provided by the user, the device 400 detects one or more local languages and displays those local languages to the user via the user interface 404 as shown in FIG. 4B. As depicted in FIG. 4B, the identified local languages include such as English, Hindi, and Kannada (indicated by 414) and are shown to the user. Upon display, the user selects the language Hindi (marked as 416) as a preferred local language as shown in FIG. 4C. Upon selection, the device changes the pre-defined language (i.e., English) to the local language (i.e., Hindi). As a result, all options (indicating as 406, 408, 410, and 412) are displayed in the language Hindi as shown via the user interface 418 of FIG. 4D. As a result, the user can now easily operate the device 400.

Figure 5:
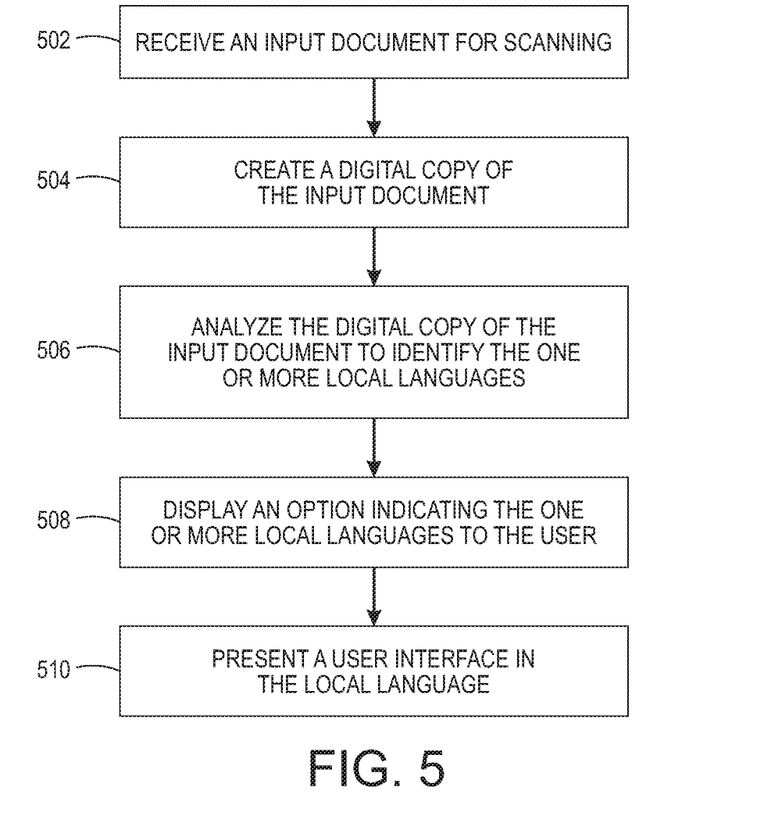
FIG. 5 shows a detailed method flowchart for localizing a user interface based on an input document.

FIG. 5 shows a detailed method flowchart for localizing a user interface of a multi-function device. The method or steps are discussed from the perspective of a multi-function device. For a person skilled in the art, it is understood that the method may be implemented for any device.

The method starts when a user wishes to perform a function of scanning, faxing, form filling, copying or others using a device such as a multi-function device. It may be considered that the user may not be able to operate the multi-function device in a pre-defined language of the device such as English. Other pre-defined languages of the multi-function device may be Japanese, French, etc., depending on the geography or location. The multi-function device includes location/geography dependent language. For example, the multi-function device may include a user interface in English language if the machine is imported/exported/sold in countries like United States of America, United Kingdom, etc.

Initially, the user provides an input document, i.e., a hard copy to the multi-function device. Then, the multi-function device waits for a pre-defined time interval such as 2 seconds, 3 seconds, 5 seconds and so on, for the user to perform any action such as pressing a button, initiate a scan or the like. If the multi-function device identifies that the user does not perform any action within the pre-defined time interval, then a local language detection process is initiated automatically. But if the multi-function device identifies the use of the multi-function device/user interface within the pre-defined time interval, a local language detection process is terminated. For the discussion of FIG. 5, it is considered that the user does not perform any action within the pre-defined time interval.

At 502, the input document is received for scanning by the multi-function device, the input document includes at least text information. The text information may be in one or more local languages (e.g., English, Hindi, Kannada, and the like) of the user. Further, the text information may be in handwritten format, machine printed format or a combination thereof. The input document is an original hard copy of the document. But, the input document may be a scanned version of the document.

Upon receiving, the input document is detected and scanned by the multi-function device. A portion of the input document may be scanned or the complete input document may be scanned. For example, initial 2-3 lines of the input document may be scanned. Here, the scanning is performed to create a digital copy (i.e., an electronic version) of the document, at 504. If partial scanning is performed, then the partially scanned electronic is created else the complete electronic version of the document is created.

At 506, the digital copy of the document is analyzed to identify the one or more local languages of the user. The analysis includes extracting the text information from the digital copy of the document. Here, character by character is extracted to capture a word using one or more character recognition techniques such as OCR (Optical Character Recognition), ICR (Intelligent Character Recognition) or the like.

Once the one or more local languages are identified, it is checked if the pre-defined language of the user interface is different from the one or more identified local languages. In case No, the method stops. Else, the method proceeds to check whether the one or more local languages are available with the multi-function device. If available, the one or more local languages are retrieved from the device. Otherwise, the one or more local languages are retrieved and downloaded from an external device present over a network such as 202 of FIG. 2. As a next step, the one or more local languages are installed and configured on the multi-function device.

After this, at 508, an option indicating the one or more local languages is displayed to the user. The user selects a preferred local language from the displayed option. Based on the user selection, the pre-defined language of the user interface is changed to the selected local language of the user. At 510, the user interface is presented in the local language of the user, where all options are displayed in the local language of the user. The user interface in the selected local language enables a user to perform one or more functions with ease. Once the user interface is presented in the local language of the user, the user can perform any function related to the multi-function device such as scanning, copying, or the like.

In some cases, the multi-function device automatically changes the pre-defined language to the local language of the user. For example, if the input document includes a single local language, then after identification, the pre-defined language is automatically switched to the local language (i.e., without displaying any option or prompt to the user).

In some cases, the user may not have a hard copy of the input document, then the user uses a USB drive containing a soft copy (i.e., electronic version) of the input document. The multi-function device uses the soft copy to identify the local language of the user as mentioned above.

The disclosure may be implemented for business devices, home devices or for any devices having the capability of scanning and/or language detection.

The present disclosure discloses methods and systems for localizing a user interface for business devices (for example multi-function devices) based on an input document and has many advantages associated therein. The methods and systems leverage the scanning technology to identify the local language from the input document. And the methods and systems perform partial scanning of the document and thus, save time. Further, the implementation of the disclosure does not require any hardware changes to existing devices and/or systems. Further, the disclosure can be implemented for differently abled people who can change the user interface to their convenient language. The disclosure further allows the user to change the default language to his native/local language without much interaction with the device and also allows the user who has less knowledge on other language, to change the default language to the local language of the device. The disclosure provides a smart way to customize the language of the user interface of the device to improve operability.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "analyzing" or "scanning" or "displaying" or "recognizing" or "identifying" "or receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for presenting a local language user interface on a multi-function device, the method comprising:
   receiving a hard copy document by the multi-function device, the multi-function device configured to scan the hard copy document, the hard copy document comprising text information in at least one local language of a user, wherein the at least one local language comprising is a single local language or the at least one local language comprises multiple local languages, and the multi-function device comprising comprises a user interface configured in a default mode to display one or more functions of the multi-function device in a default language and configured in a local mode to display the one or more functions of the multi-function device in the at least one local language single local language or in a local language selected from the multiple local languages;
   scanning a portion of the hard copy document to create an electronic document;

analyzing the electronic document to identify the at least one local language; and upon identification of the single local language from the electronic document, automatically presenting the user interface in the local mode in the single local language, upon identification of the multiple local languages, displaying a local language option on the user interface, based on the analysis of the electronic document, for the user to select a local language from the multiple local languages identified from the electronic document as the single a selected local language, and upon selection of the single local language, presenting the user interface in the local mode in the single selected local language, wherein the user interface in the local mode enables the user to operate the multi-function device in the single local language or the selected local language.

2. The method of claim 1, further comprising checking if the default language of the user interface is different from the single local language or the selected local language.

3. The method of claim 2, further comprising resetting the default language of the user interface to the single local language or the selected local language.

4. The method of claim 1, further comprising presenting the user with a default language option to reset the default language of the user interface to the single local language or the selected local language.

5. The method of claim 1, wherein the hard copy document comprises the text information in the multiple local languages.

6. The method of claim 1, wherein the analyzing comprises extracting the text information from the electronic document using at least one of: Optical Character Recognition (OCR), Intelligent Character Recognition (ICR), Optical Word Recognition (OWR), and Intelligent Word Recognition (IWR).

7. A processor implemented method for localizing a user interface of a multi-function device, comprising:
    detecting an input document received by the multi-function device, wherein the input document comprises text information in one or more local languages of a user, and the multi-function device comprising a user interface configured in a default mode to display one or more functions of the multi-function device in a pre-defined language and configured in a local mode to display the one or more functions of the multi-function device in a local language;
    processing the input document to recognize the one or more local languages in the text information of the input document;
    displaying a local language option, based on the input document processing, indicating the one or more local languages recognized in the text information of the input document to the user on the user interface;
    receiving a selection of the local language from the one or more local languages displayed on the user interface; and
    based on the selection, changing the user interface to the local mode to display the local language.

8. The processor implemented method of claim 7, wherein the input document is a hard copy of the document.

9. The processor implemented method of claim 7, wherein processing the input document comprises extracting a portion of the text information from the input document to recognize the one or more local languages.

10. The processor implemented method of claim 7, wherein the displaying the local language option comprises querying one or more language databases.

11. The processor implemented method of claim 10, wherein the one or more language databases are a part of the multi-function device.

12. The processor implemented method of claim 10, wherein the one or more language databases are stored on an external device.

13. The processor implemented method of claim 10, further comprising retrieving and downloading the one or more local languages from an external device.

14. A method for localizing a user interface, the method comprising:
    scanning a hard copy of an input document using a multi-function device to create an electronic document, the input document comprising text information in at least one local language of a user, wherein the at least one local language comprising is a single local language or the at least one local language comprises multiple local languages, the multi-function device automatically presenting presents a user interface in a default mode displaying one or more functions of the multi-function device for operation in a pre-configured language, and the multi-function device configured in a local mode to display the one or more functions of the multi-function device in the at least one local language single local language or in a local language selected from the multiple local languages;
    performing one or more character recognition operations on the electronic document to identify the at least one local language in the text information; and
    based on the identification, automatically changing the user interface from the default mode to the local mode upon identification of the single local language, displaying a local language option on the user interface for the user to select the single a local language upon identification of multiple local languages, and upon selection of the single local language, changing from the default mode to the local mode in the single selected local language, for performing the one or more functions by the user in the single local language or the selected local language.

15. The method of claim 14, wherein the one or more functions comprise scanning, copying, and faxing.

16. The method of claim 14, wherein the scanning the hard copy further comprises performing a partial scanning of the hard copy of the input document.

17. The method of claim 14, further comprising presenting a pre-configured language option to the user to reset the pre-configured language to the single local language or the selected local language.

18. A multi-function device for localizing a user interface, the multi-function device comprising:
    the user interface in a default mode configured to display one or more functions of the multi-function device for operation in a pre-defined language, and the multi-function device configured in a local mode configured to display the one or more functions of the multi-function device in at least one local language of a user, wherein the at least one local language comprising is a single local language or the at least one local language comprises multiple local languages;
    a feeder unit configured to receive a hard copy of a document, the document comprising at least text information in the at least one local language;

a scanner configured to scan the hard copy of the document to create an electronic document; and
a control system configured to:
analyze the electronic document to identify the at least one local language from the text information, and
automatically change the user interface, based on the analysis of the electronic document, from the default mode to the local mode upon identification of the single local language from the electronic document, displaying a local language option on the user interface, based on the analysis of the electronic document, for the user to select the single a local language upon identification of multiple local languages from the electronic document, and upon selection of the single local language, changing from the default mode to the local mode in the single selected local language, for operating the multi-function device in the single local language or the selected local language.

19. The multi-function device of claim 18, wherein the control system is further to extract a portion of the text information from the document using one or more pre-defined character recognition techniques.

20. The multi-function device of claim 19, wherein the one or more pre-defined character recognition techniques comprise: Optical Character Recognition (OCR), Intelligent Character Recognition (ICR), Optical Word Recognition (OWR), and Intelligent Word Recognition (IWR).

21. The multi-function device of claim 18, wherein the control system is configured to retrieve the single local language or the selected local language by querying one or more language databases.

22. The multi-function device of claim 21, wherein the one or more language databases are a part of the multi-function device.

23. The multi-function device of claim 21, wherein the one or more language databases are stored on an external device.

24. The multi-function device of claim 23, wherein the multi-function device is communicatively coupled to the external device.

25. The multi-function device of claim 24, wherein the control system is configured to:
download the single local language or the selected local language from the external device; and
install and configure the single local language or the selected local language on the multi-function device.

26. The multi-function device of claim 18, wherein the scanner is configured to partially scan the hard copy of the document.

27. The multi-function device of claim 18, wherein the pre-defined language is reset to the single local language or the selected local language based on an input from the user.

28. A system, comprising:
a server configured to:
receive an electronic document from a multi-function device, the electronic document comprising at least text information in at least one local language of a user,
extract a portion of the text information to identify the at least one local language using one or more techniques, and
send the identity of the at least one local language to the multi-function device; and
the multi-function device, the multi-function device comprising a user interface being in communication with the server, and being configured to:
display on the user interface in a default mode one or more pre-defined options in a pre-defined language for selecting one or more functions of the multi-function device;
receive the at least one local language identification from the server;
display a local language option, based on the at least local language identification received, to the user for selection of a single local language;
process the selection to change the user interface from the pre-defined language to the single selected local language; and
display on the user interface in a local mode the one or more pre-defined options in the single selected local language of the user for selecting the one or more functions of the multi-function device.

29. The system of claim 28, wherein the multi-function device comprises a feeder unit for receiving a hard copy of the electronic document.

30. The system of claim 28, wherein the multi-function device comprises a scanner for scanning a hard copy to create the electronic document.

31. The system of claim 28, wherein the multi-function device is configured to retrieve the single selected local language.

* * * * *